United States Patent Office 2,872,331
Patented Feb. 3, 1959

2,872,331

MANUFACTURE OF CELLULOSE ESTER MATERIALS

Dennis Grady, Harold Bates, and James Wotherspoon Fisher, Spondon, near Derby, England, assignors to British Celanese Limited, a corporation of Great Britain No Drawing. Application April 25, 1955
Serial No. 503,794

Claims priority, application Great Britain April 28, 1954

8 Claims. (Cl. 106—178)

This invention relates to the manufacture of cellulose ester materials, and especially to the manufacture of cellulose ester filamentary materials such as yarns, bristles and straws by melt spinning processes.

U. S. applications S. Nos. 243,994, filed August 28, 1951, 292,772, filed June 10, 1952, 304,441, filed August 14, 1952, 338,834, filed February 25, 1953, now Patent No. 2,831,748, 423,743, filed April, 16, 1954, 344,786, filed March 26, 1953, and 344,738, filed March 26, 1953, describe methods whereby artificial filamentary materials can be made by melt spinning cellulose esters, especially cellulose acetates. The cellulose acetates which can be melt spun by the processes described in these specifications include both acetone-soluble cellulose acetates and cellulose acetates having an acetyl value higher than is compatible with complete solubility in acetone, and in particular higher than about 59% reckoned as acetic acid, hereinafter referred to as cellulose triacetates.

Experience has shown that cellulose acetates, and especially cellulose triacetates, differ considerably among themselves in the ease with which they can be melt spun and in the appearance of filamentary materials made from them by melt spinning. Thus while some cellulose acetates can be spun for long periods without trouble, others tend to form a material containing an undue proportion of broken filaments or even give rise to occasional complete breakages in the filamentary material being spun. Similarly while some cellulose acetates produce substantially colourless filamentary materials, other give products which are apt to be somewhat discoloured.

It might be thought that the differences in the melt spinning properties of different cellulose acetates could be accounted for in the same way as the differences in the moulding properties of different cellulose acetates, but this is not the case. On the contrary, the suitability of cellulose acetates for melt spinning is by no means parallel to their suitability for moulding; thus a cellulose acetate which can be moulded satisfactorily—i. e. without undue viscosity loss and discolouration—will often be difficult to melt spin, giving rise to broken filaments and/or discolouration as described above.

In describing the present invention it will be necessary to refer to a property which for convenience will be termed the pH of the cellulose acetate (or other cellulose ester). By this we mean the pH which would be acquired by pure water brought into intimate contact with and caused to permeate thoroughly the cellulose acetate. Cellulose acetate itself (except for certain highly degraded or hydrolysed products which are not normally used commercially for the manufacture of filamentary materials or moulded articles) is not soluble in water, and if absolutely pure could therefore not be said to have a pH value at all, in the sense defined above. But in practice cellulose acetate is rarely quite pure; thus it almost invariably contains a little water and usually also acidic or basic substances, e. g. sulphuric or other acid remaining from its manufacture or salts such as alkali metal alkaline earth metal and magnesium carbonates and bicarbonates which have been introduced either deliberately to prevent the later development of free acidity, or incidentally by the use of hard water for washing the cellulose acetate. It is these substances which determine what we have termed the pH of the cellulose acetate.

The present invention is based on the discovery that cellulose esters, especially cellulose acetates, which have a pH outside the range 6–7.5, are liable when melt spun to give products which contain an excessive number of broken filaments or are discoloured or suffer from both of these defects.

According to the invention therefore an organic acid ester of cellulose, especially a cellulose acetate, which has a pH below 6 or above 7.5 is given a treatment whereby its pH is brought between these limits, and is then formed into filamentary material by a melt spinning process. In the preferred form of the invention a cellulose ester having a pH below 6.4 or above 7.0 is treated to bring its pH within these limits before it is melt spun.

While the invention is applicable to the melt spinning of cellulose esters in general, especially esters of saturated monocarboxylic acids containing 2–4 carbon atoms in the molecule, its practical importance is greatest in connection with cellulose acetates, especially cellulose triacetates, and the invention will be described in more detail by reference to these particular esters.

Cellulose triacetates for use in the process of the invention may for example have been made by a process of the suspension type, in which they retain the fibrous form of the cellulose starting material. Alternatively cellulose triacetates, and also acetone-soluble cellulose acetates, may be in the form of a more or less fibrous flake obtained by precipitation from a solution, for example an acetylation solution. Either fibrous cellulose triacetate or flake cellulose acetate of either kind may with advantage be ground to a powder before its pH is adjusted.

Cellulose acetates as received from the manufacturer usually have a pH which, if it is not within either the narrower or the wider of the specified ranges, is on the alkaline side, i. e. above 7.0 or 7.5. Usually therefore the practice of the invention involves reducing the pH to a value below 7.5 and preferably below 7.0 (though not of course lower than 6.0 and preferably not lower than 6.4).

One method by which this may be done consists in impregnating the cellulose acetate with an acid of dissociation constant above about $10^{-6}$, using a very dilute solution of the acid as the impregnating agent. Examples of such acids which may be used are acetic, oxalic, lactic, citric, tartaric, succinic, phosphoric, nitric, hydrochloric and sulphuric acids. The stronger the acid the more critical is the amount which must be employed if the pH of the cellulose acetate is not to be brought too low, and partly for this reason it is preferred to employ the moderately weak acids such as tartaric, citric and phosphoric acids, which provide more latitude than stronger acids such as sulphuric, hydrochloric, nitric and oxalic acids. The very weak acids such as acetic and succinic acid are again less desirable. More generally, when the pH of the cellulose acetate is to be brought from above to within either of the specified ranges by impregnation with an acid, we prefer to use an acid of dissociation constant between about $1 \times 10^{-4}$ and $2 \times 10^{-2}$.

The impregnating acid may be applied to the cellulose acetate in any suitable way which permits the necessary degree of control over the amount of acid taken up by the cellulose acetate. For example the cellulose acetate may be washed with a very dilute aqueous solution of the acid until a sample has the desired pH. Another method which gives a very close control over the amount of acid incorporated in the cellulose acetate consists in spraying the cellulose acetate with an aqueous solution of the acid while continuously stirring or otherwise mixing it until the acid is uniformly distributed throughout the mass of cellulose acetate. We have however found that a satisfactory degree of control over the amount of acid taken up by the cellulose acetate can be achieved with a much smaller expenditure of power by soaking the cellulose acetate in a bath of a dilute solution of the acid until it has been uniformly impregnated, and then separating the cellulose acetate from the bulk of the solution as by decantation, filtration or centrifuging; the concentration of the acid solution and the amount allowed to remain on the cellulose acetate will of course be mutually adjusted so as to leave the required amount of acid, which will usually be between 0.004 and 0.03% by weight, on the cellulose acetate.

In all these methods the acid solution may be at room temperature or below or at a higher temperature. While higher temperatures have the advantage of causing the impregnation of the cellulose acetate to take place more quickly, even at room temperature a period of about 1–3 hours is usually sufficient and such temperatures are therefore in general more economical.

After the cellulose acetate has been impregnated with the required amount of the acid solution it is dried by evaporation, for example by heating it preferably to a temperature above 100° C., and especially between 100° and 150° C., in vacuo or in a current of heated air.

Although very good results can be obtained by the methods described above, they have the drawback that it is not always easy to determine with the necessary degree of precision the amount of acid with which the cellulose acetate must be impregnated to give it the desired pH. In addition they are useful only in reducing the pH of the cellulose acetate, and cannot be employed when this is initially too low.

These disadvantages may be avoided by employing, instead of free acid, a buffer mixture of salts of a dibasic or polybasic acid capable of maintaining a pH between 6.0 and 7.5, and especially between 6.4 and 7.0, and this is the preferred method of putting our invention into practice. When such a buffer mixture is used the amount deposited in the cellulose acetate may be varied over a much wider range than can the amount of free acid, though excessively large amounts, in particular amounts containing more than about 0.05% or 0.1% of sodium, based on the weight of the cellulose acetate, or an equivalent amount of another cationic salt component, may give rise to discolouration and are best avoided. Amounts between 0.01 and 0.05%, and especially between 0.01 and 0.03%, reckoned as sodium, are generally preferred. Particularly useful buffer mixtures are provided by the sodium or other alkali metal phosphates, citrates, and tartrates, though other mixtures capable of bringing and maintaining the pH of the cellulose acetate within the specified ranges can also be used with good effect, provided of course that the salts composing them are stable at the temperatures to be employed in melt spinning the cellulose acetate. To compensate for small changes in the buffer mixture resulting from its reaction with acid or alkaline compounds in the cellulose acetate, the buffer mixtures as used may with advantage have a pH slightly above or below that which it is desired to impart to the cellulose acetate, according to whether the pH of the cellulose acetate is initially too low or too high. For example cellulose acetate having a pH above 7.5 may be impregnated with about 0.01–0.03% of its weight of a sodium phosphate, sodium citrate or sodium tartrate buffer mixture (reckoned as sodium) of initial pH about 6.0–6.5, though mixtures of pH up to about 7 can also be used with good effect.

In an important modification of the invention the melt spinning properties of cellulose acetates, especially cellulose triacetates, which already have a pH between 6 and 7.5 or between 6.4 and 7.0 are further improved by impregnating them with buffer mixtures having a pH within these limits before they are melt spun. In such cases it is preferable to use relatively small amounts of the buffer mixture; for example a sodium phosphate, sodium citrate or sodium tartrate buffer mixture may be used in amount about 0.005–0.01% (reckoned as sodium) on the weight of the cellulose acetate. Cellulose acetates having a pH within these limits can sometimes be obtained by washing more acid or alkaline acetates with water which is substantially free from metallic cations, such as distilled water or water which has been freed from metallic cations by an ion-exchange process, hereinafter termed demineralised water, especially when such water is used in at least the final stages of washing the crude precipitate obtained in acetylation processes of the solution type or fibrous cellulose triacetate produced in processes of the suspension type.

The phosphate or other buffer mixture may be incorporated in the cellulose acetate by the methods described above for impregnating the cellulose acetate with a free acid.

The impregnating agent, whether free acid or buffer mixture, may be incorporated in the cellulose acetate after the latter has been washed and before it is dried in the course of its manufacture, or at any time after it has been dried.

In describing the invention reference has so far been made only to aqueous solutions of the acids and buffer mixtures. However other solvents for the acids and buffer mixtures may be used, in particular mixture of water and a water miscible organic liquid having some swelling or solvent action on the cellulose acetate, e. g. methanol or another water-miscible monohydric alcohol. Such a mixture may contain between about 10 and 95% of water, though preferably the amount of organic swelling agent or solvent is never high enough to cause the mixture to swell the cellulose acetate strongly.

The difference between the factors involved in suitability for melt spinning and suitability for moulding, to which reference has already been made, is shown further by the fact that while a cellulose triacetate can be rendered suitable for melt spinning by treatment with an aqueous solution of a buffer mixture as described above, it has not in the past been found practicable to stabilise cellulose triacetates for moulding by the use of these solutions. We have however found, and this constitutes a further aspect of the invention, that organic acid esters of cellulose, in particular cellulose triacetates and cellulose esters containing a considerable proportion of esterifying groups derived from organic acids containing three or more carbon atoms in the molecule, can be stabilised for moulding by impregnating them with a buffer mixture of salts which in water has a pH between 6 and 8, using as the impregnating agent a solution of the salts in a solvent mixture consisting of water and a volatile organic liquid which has some swelling action on the cellulose ester. The impregnation may be effected by any of the methods already described, for example by soaking the cellulose ester in the solution at room temperature or a higher temperature until it is thoroughly and uniformly impregnated by the solution, and then removing the solvent by evaporation, generally after pressing out part of the solution. The organic component of the solvent mixture is preferably methanol, but it may be another completely water-miscible monohydric alcohol such as ethanol, or isopropanol, or a non-alcoholic liquid such for example as acetone. Thus the salt buffer mixture may with advantage be applied to a cellulose triacetate in solution in aqueous methanol containing at least 40% by volume, and preferably 60–90% by volume, of methanol, mixtures having a methanol content of 65%–85% by volume being particularly effective. The concentration of the salts in the solution may be between about 0.005 and 0.5%, reckoned as sodium, and the concentration and the amount of solution retained in the cellulose ester are preferably so correlated that after the evaporation of the solvent the cellulose ester contains between about 0.01 and 0.25% of the salts, reckoned as sodium. While the optimum amount of the salt buffer mixture to be retained will depend on the pH of the cellulose ester (and thus on the proportions of residual acidic or basic impurities which it contains), the latitude afforded by the use of a buffer mixture ensures that once this optimum amount has been determined for a cellulose ester made by a given method, no further tests need be made on subsequent batches provided no substantial alteration is made in the esterification process.

The water employed in making up the solution of the free acid or buffer mixture, whether or not it is used in admixture with an organic swelling agent or solvent for the cellulose acetate, may be town's water or river water or the like, or a softened, distilled or demineralised water. If hard water, or any water containing alkaline salts, is used the amount of free acid added to it should be augmented by the amount equivalent to the alkaline salts in the water. Similarly if a buffer mixture is used the amount may be augmented when it is dissolved in hard water, though in this case the latitude in the amount of buffer mixture which may be used is generally sufficient to render such augmentation unnecessary.

The invention is further illustrated by the following examples.

Example I

A particular batch of cellulose triacetate was made by acetylating cellulose with acetic anhydride using sulphuric acid as catalyst and acetic acid as the solvent for the cellulose triacetate, and was washed free from acid in the usual way with fairly hard water. The dried cellulose triacetate was powdered and compressed into tablets, which were used for producing a multi-filament yarn by the melt spinning process described in U. S. application S. No. 423,743. The yarn contained an undue number of broken filaments and at times spinning was actually interrupted by filament breakage and had to be restarted. This particular cellulose acetate was therefore classed as a "poor spinner."

Samples of cellulose triacetate from the same batch were impregnated with the following solutions, drained until they contained about their own weight of water and then heated in a current of air to a temperature of 125° C. until they were thoroughly dry. The impregnating solutions were:

(1) A 0.005% aqueous solution of phosphoric acid in water;
(2) A 0.005% solution of tartaric acid in water;
(3) A 0.005% solution of tartaric acid in a mixture of 90 volumes of water to 10 volumes of methanol;
(4) A 0.005% solution of lactic acid in a mixture of 40 volumes of water to 60 volumes of methanol;
(5) A 0.02% aqueous solution of the sodium hydrogen phosphates (reckoned as sodium) of pH 6.3.
(6) A 0.02% solution of the same salt mixture (reckoned as sodium) in a mixture of 40 volumes of water to 60 volumes of methanol.
(7) A 0.02% aqueous solution of the sodium tartrates (reckoned as sodium) of pH 6.3.

A further sample was washed thoroughly with demineralised water and was then impregnated with 0.007% of its weight of a buffer mixture of the sodium hydrogen phosphates (reckoned as sodium) of pH 6.7 in aqueous solution.

After each of these treatments the cellulose triacetate could be melt spun under the same conditions as before to give a very satisfactory yarn containing few or no broken filaments and of good appearance and textile properties.

Example II

A celluose triacetate was made by acetylating cellulose with acetic anhydride in the presence of acetic acid to dissolve the triacetate formed and of sulphuric acid as catalyst, and was given a short ripening treatment to reduce its acetyl value to about 60.5% reckoned as acetic acid. If this triacetate, without any stabilising treatment, was mixed with 30% of its weight of dimethyl phthalate and the mixture moulded to discs for 15 minutes at 200° C., its viscosity fell by well over 50% and it became seriously discoloured.

The cellulose triacetate was therefore stabilised by soaking it for one hour in a solution of di-sodium monohydrogen phosphate and monosodium di-hydrogen phosphate in a mixture of three volumes of methanol and one volume of water. The concentration of the salts in the solvent mixture, reckoned as the proportion by weight of sodium in the solvent, was 0.15%, and the relative amounts of the two salts were such that a purely aqueous solution of the salt mixture had a pH of 7.0. Excess solution was then drained off, leaving on the cellulose triacetate about its own weight of solution. The cellulose triacetate was then dried in a current of warm air so as to evaporate the solvent and leave the salts deposited uniformly throughout the triacetate.

On moulding the stabilised cellulose triacetate under the conditions already described, the viscosity loss was only 4.5%, and the amount of discolouration was within the limits normally regarded as acceptable.

If instead of the aqueous methanolic solution a solution of the same salt mixture in water was employed, the degree of stabilisation effected was completely unsatisfactory for moulding purposes.

Having described our invention, what we desire to secure by Letters Patent is:

1. Process for the manufacture of artificial filamentary materials from an unplasticized cellulose triacetate having a pH outside the range 6.0–7.5, which comprises bringing the pH of the cellulose triacetate within this range by incorporating uniformly in it a buffer mixture of salts of an acid of basicity at least 2, and then forming the unplasticized cellulose triacetate into filamentary material by a melt spinning process.

2. Process for the manufacture of artificial filamentary materials from an unplasticized cellulose triacetate having a pH outside the range 6.4–7.0, which comprises bringing the pH of the cellulose triacetate within this range by incorporating uniformly in it a buffer mixture of salts of an acid of basicity at least 2, and then forming the unplasticized cellulose triacetate into filamentary material by a melt spinning process.

3. Process according to claim 2, wherein there is incorporated in the cellulose triacetate a buffer mixture of alkali metal salts of an acid selected from the group which consists of phosphoric, citric and tartaric acids.

4. Process according to claim 2, wherein the metal cationic component of the buffer mixture, reckoned as sodium, amounts to 0.01–0.05% of the weight of the cellulose triacetate.

5. Process for the manufacture of artificial filamentary materials from an unplasticized cellulose triacetate having a pH above 7.5, which comprises incorporating uniformly in the cellulose triacetate a buffer mixture of alkali metal salts of an acid selected from the group which consists of phosphoric, citric or tartaric acids, the pH of the said buffer mixture being between 6.0 and 7.0, and the amount, reckoned as sodium, being between 0.01 and 0.03% of the weight of the cellulose triacetate, and then forming the unplasticized cellulose triacetate into filamentary materials by a melt spinning process.

6. Process for the manufacture of artificial filamentary materials of cellulose triacetate, which comprises melt spinning unplasticized cellulose triacetate having a pH 6–7.5, and containing a buffer mixture of salts having a pH within this range.

7. Process for the manufacture of artificial filamentary materials of cellulose triacetate, which comprises melt spinning unplasticized cellulose triacetate having a pH 6.4–7.0, and containing a buffer mixture of salts having a pH within this range.

8. Process according to claim 7, wherein the cellulose triacetate contains a buffer mixture of alkali metal salts of an acid selected from the group which consists of phosphoric, citric and tartaric acids, the said buffer mixture having a pH of 6.4–7.0.

References Cited in the file of this patent

UNITED STATES PATENTS

| | | |
|---|---|---|
| Re. 23,700 | Lochridge | Aug. 18, 1953 |
| 573,132 | Bronnert | Dec. 15, 1896 |
| 1,310,841 | Robinson | July 22, 1919 |
| 1,463,864 | Bent | Aug. 7, 1923 |
| 2,023,363 | Bogin et al. | Dec. 3, 1935 |
| 2,124,611 | Dreyfus | July 26, 1938 |
| 2,280,863 | Stern | Apr. 28, 1942 |
| 2,303,338 | Dreyfus et al. | Dec. 1, 1942 |
| 2,336,159 | Bent | Dec. 7, 1943 |
| 2,449,149 | Santoro et al. | Sept. 14, 1948 |
| 2,713,546 | Williams | July 19, 1955 |

FOREIGN PATENTS

| | | |
|---|---|---|
| 278,696 | Great Britain | Oct. 4, 1928 |